April 26, 1938.    R. A. BRADEN    2,115,694
TUNED RADIO FREQUENCY AMPLIFIER
Filed May 16, 1928    5 Sheets-Sheet 1
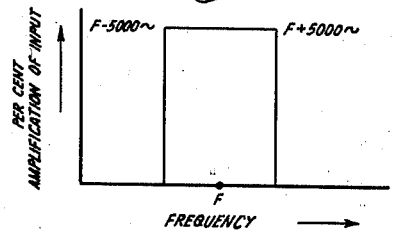
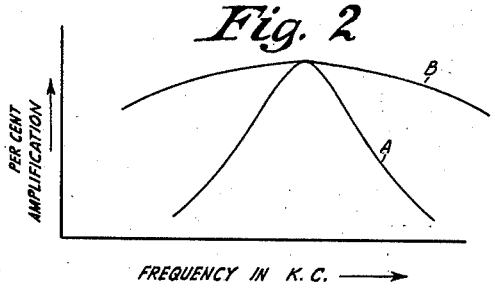
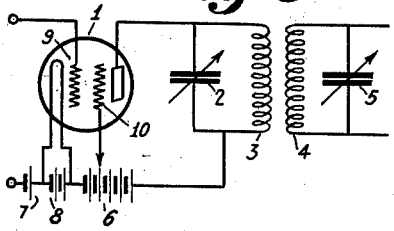
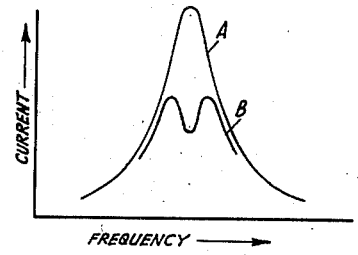
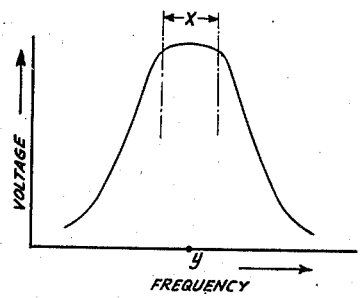
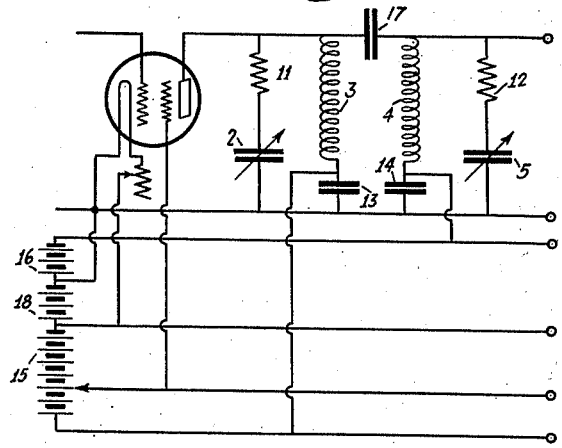
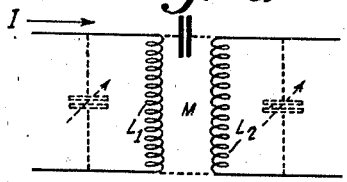
INVENTOR
R.A. BRADEN
BY
ATTORNEY

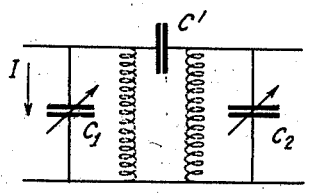
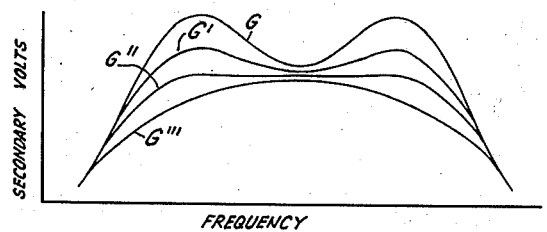
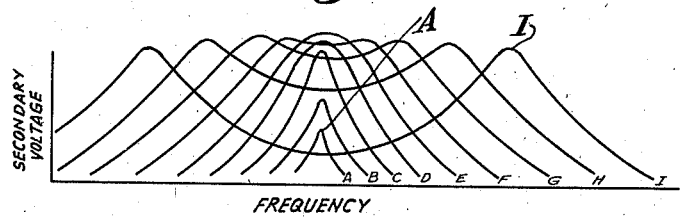
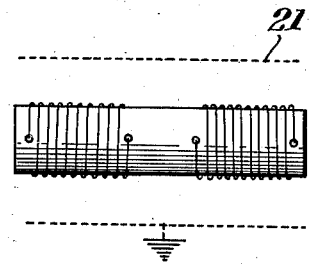
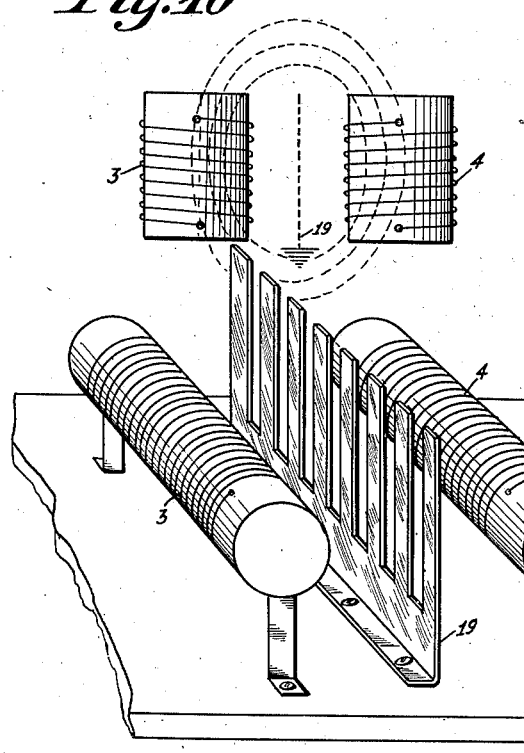

April 26, 1938.     R. A. BRADEN     2,115,694
TUNED RADIO FREQUENCY AMPLIFIER
Filed May 16, 1928     5 Sheets-Sheet 3

INVENTOR
R. A. BRADEN
BY *Ira J Adams*
ATTORNEY

April 26, 1938.    R. A. BRADEN    2,115,694
TUNED RADIO FREQUENCY AMPLIFIER
Filed May 16, 1928    5 Sheets-Sheet 4

INVENTOR
R. A. BRADEN
BY Ira J. Adams
ATTORNEY

Patented Apr. 26, 1938

2,115,694

UNITED STATES PATENT OFFICE 2,115,694

TUNED RADIO FREQUENCY AMPLIFIER

Rene A. Braden, New York, N. Y., assignor to Radio Corporation of America, a corporation of Delaware Application May 16, 1928, Serial No. 278,105

31 Claims. (Cl. 179—171)

This invention relates to radio signalling apparatus and especially to a tuned radio frequency amplifier for a radio receiver.

An object of my invention is to make a radio receiver for receiving modulated radio frequency waves which will respond with substantially equal amplification to all of the frequency components contained in the modulation within the limits of a certain band of frequencies.

Another object is to provide means for keeping the received band substantially constant in width as the receiver circuits are adjusted to receive at various wavelengths or wave frequencies of the carrier current.

Other objects as well as advantages of my invention will appear as the explanation and description thereof, which will be given with the aid of the accompanying drawings, proceeds.

In the drawings:

Fig. 1 is a resonance curve of a theoretically perfect radio frequency amplifier;

Fig. 2 shows resonance curves of an ordinary radio receiver;

Fig. 3 illustrates a circuit with which I shall analyze the operation of my invention;

Figs. 4 and 5 illustrate resonance curves of tuned circuits;

Fig. 6 represents a single stage selective amplifier, suitable for use in a multi-stage receiver to be built according to my invention;

Figs. 7a and 7b are circuits into which my invention shown in Fig. 6 may be separated for purposes of analysis;

Fig. 8 is a group of resonance curves made by utilizing the circuits shown in Fig. 6;

Fig. 9 shows the effect on the resonance curve G of Fig. 8 of adding resistance to the circuits shown in Fig. 6;

Figure 16:
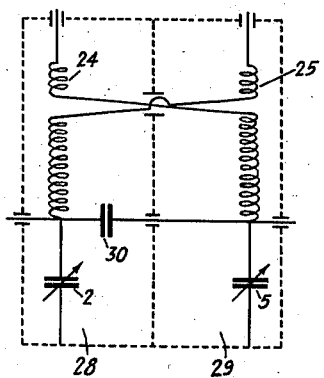
Figure 17:
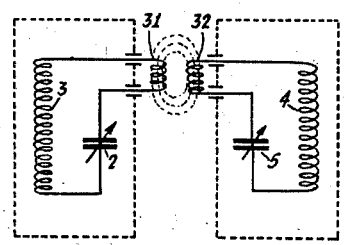
Figure 18:
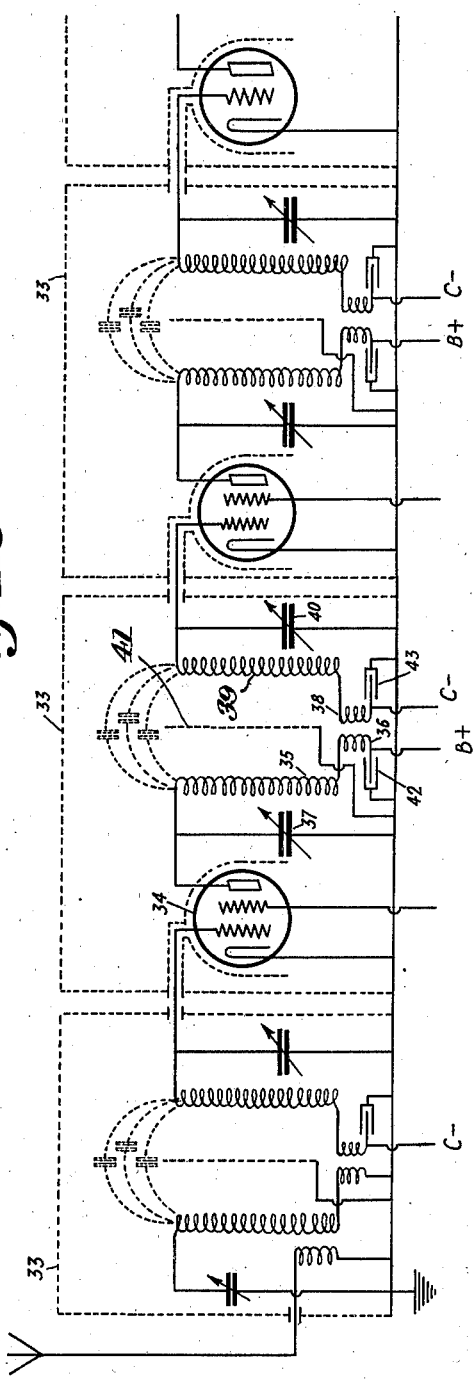
Figure 19:
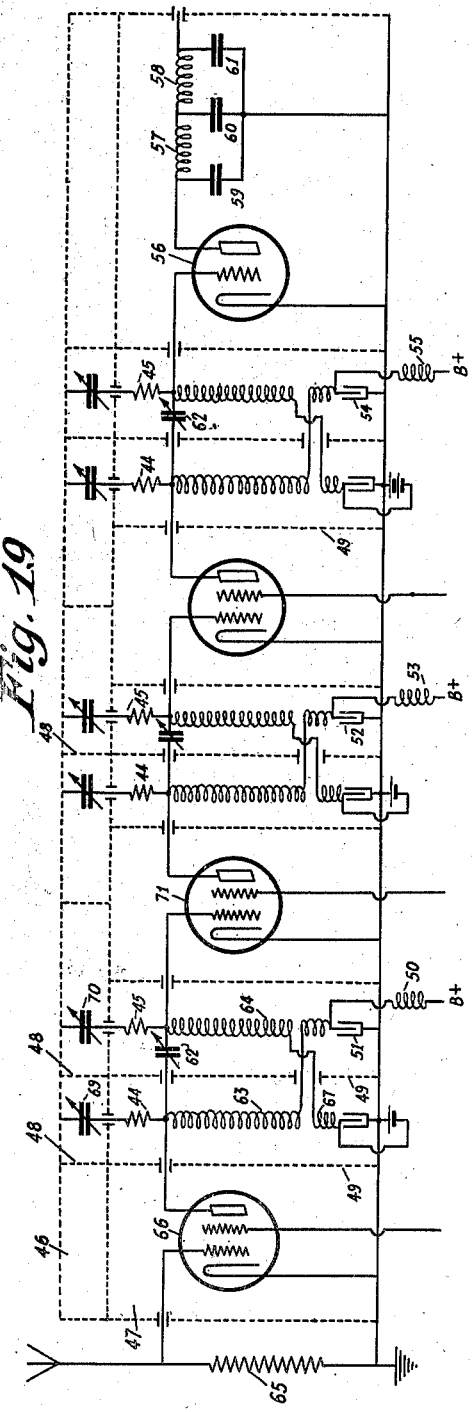
Figure 20:
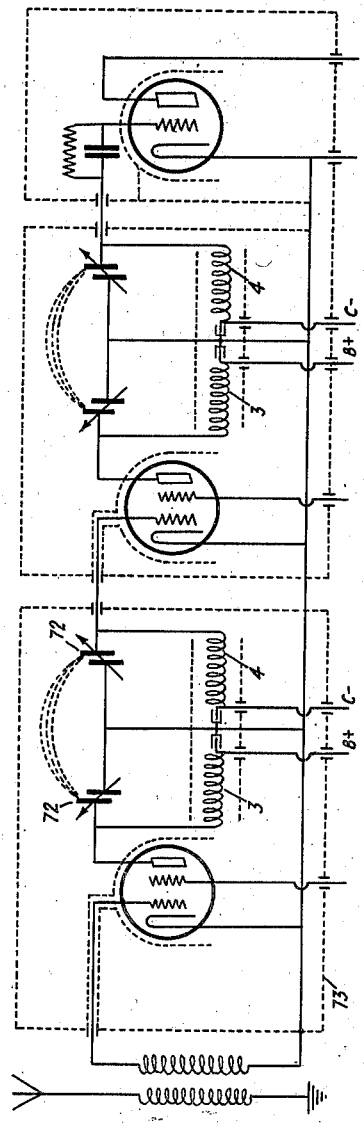

Figs. 10 to 17 inclusive, show, according to my invention, various methods of coupling tuned circuits between amplifier stages; and Figs. 18, 19, and 20 show receivers built according to my invention.

Radio telephone signals are transmitted by means of a "carrier current" (a high frequency current of constant frequency) whose amplitude is modulated by low-frequency currents which are produced by the action of sound waves on a microphone or telephone transmitter. This modulated carrier current can be shown mathematically to be equivalent to a carrier current of constant amplitude and two groups of currents, one having frequencies above the carrier frequency and the other having frequencies below the carrier frequency. The differences between the carrier frequency and the various frequencies in each group are equal to the frequencies contained in the original audio-frequency modulating current. The two groups of currents of higher and lower frequency respectively are generally known as the upper and lower side-bands. To receive such a modulated wave, and preserve the relative intensities of the original modulating currents, it is obvious that a receiver will be required which will respond with equal amplification to all frequencies contained in the two sidebands. As indicated before, it is an object of this invention to provide such a receiver.

It is well known that speech and music contain frequencies from below 100 cycles to above 5000 cycles per second. High quality reproduction requires that this full range of frequencies be transmitted and reproduced with equal efficiency. In a radio receiver, this means that the amplification must be substantially uniform over a range of at least 5000 cycles above and below the carrier frequency, and at the same time good selectivity of the receiver must be had.

In broadcast transmission it is common practice to set different stations on carrier frequencies 10 kilocycles apart. Each station transmits a modulated wave containing all frequency components between (F−5000) and (F+5000), where F is the carrier frequency of the station. The receiver must not respond to any frequency more than 5000 cycles away from the carrier frequency to which it is tuned. An ideal receiver for broadcast reception would be one having a relation between frequency and amplification such as shown in Fig. 1.

Such a curve, namely, a frequency vs. amplification curve is generally called a resonance curve. It is common practice to make resonance curves for various receivers and radio frequency amplifiers as a test of their performance, the procedure being to impress on the input terminals of the receiver or amplifier an unmodulated radio frequency voltage of constant amplitude, and measure the amplified voltage at the output while the input frequency only is varied.

Resonance curves for an ordinary receiver using three stages of simple tuned radio frequency amplification are shown in Fig. 2, curve A illustrating the resonance curve made at a carrier or mean wave frequency of 600 kilocycles, the range of frequencies being from 580 to 620 kilocycles; and curve B illustrating a resonance curve made at a carrier wave frequency of 1400 kilocycles, the variation being from 1360 kilocycles to 1440 kilocycles.

These two curves illustrate the two defects of the ordinary system of radio frequency selective amplification, such as is used in practically all of the receivers now manufactured for broadcast reception. At low carrier wave frequencies the amplification drops off very rapidly on each side of resonance, with the result that the high frequency components contained in the modulation are attenuated, and the quality of reproduction is poor. At high carrier wave frequencies, on the other hand, the amplification is substantially uniform over the frequency band required for faithful reproduction, but the selectivity is so poor that there is practically no discrimination against the two stations whose carrier frequencies are 10 kilocycles above and 10 kilocycles below the carrier of the station to which the receiver is tuned, i. e., stations whose carrier frequencies are F—10,000 and F+10,000 where F is the carrier to which the receiver is tuned.

By my invention, I remedy these objections to the ordinary tuned radio frequency amplifier and provide, as will be disclosed hereinafter an amplifier which, no matter to what carrier frequency it may be tuned within the ordinary broadcasting range, will amplify equally all frequencies within the band allocated to the station tuned to, and will not respond to frequencies beyond that band. In other words, I provide an amplifier having a substantially flat resonance curve of constant width regardless of the carrier frequency to which it is tuned.

My invention will be further understood by considering Fig. 3. Numeral 1 denotes a vacuum tube of the four electrode, screen-grid type, 3 and 4 are inductance coils, 2 and 5 are variable tuning condensers. Coils 3 and 4, and condensers 2 and 5 need not be of the same size, the only requirement being that circuits 2, 3 and 4, 5 are capable of being tuned to the same frequency. 6 is a battery for supplying plate and screen voltage to the vacuum tube, 7 is a grid battery and 8 is a filament battery. 9 indicates the control electrode and 10 the screen grid. The coils 3 and 4 are coupled together inductively.

The operation of the circuit of Fig. 3 may be explained by assuming that a radio frequency voltage is impressed on the input terminals of that figure, that is, on the control grid 9 of the vacuum tube 1, and by considering the effect of varying the frequency of the impressed voltage. The circuit consisting of the coil 3 and the condenser 2 must be tuned to some particular frequency, that is, the resonance frequency. The coil 4 and condenser 5 must be tuned to the same frequency.

Now assume that the input voltage is started at a frequency below resonance and gradually raised to a frequency above resonance. As the frequency approaches resonance, the current in 2 and 3 will rise. In the absence of the secondary circuit 4 and 5 the current would follow curve A of Fig. 4, reaching the highest point at exact resonance. With the secondary circuit tuned and coupled as described above, the primary current follows the curve B.

The current flowing in the coil 3 induces a voltage in the coil 4 which is equal to the product of the frequency, the mutual inductance between 3 and 4, and the current in 3. As the variation in frequency considered is very small compared with the mean frequency, it is sufficiently accurate to say that the voltage induced in coil 4 is proportional to the current in the coil 3. The induced voltage therefore varies with frequency as curve B of Fig. 4.

The current in the secondary circuit is equal to the product of the induced voltage in 4 multiplied by the admittance of 4 and 5 in series. If 4 and 5 are assumed for convenience to be identical with 3 and 2, respectively, the admittance curve of the secondary circuit will be the same as that of the primary, and will be the same as curve A of Fig. 4. The secondary current can therefore be determined as a function of frequency by multiplying together the two curves, A and B. The result of this operation, multiplied by certain constants depending on the values of inductance and capacity used in the two circuits, gives a curve showing the voltage developed across the secondary coil and condenser when a constant voltage of variable frequency is impressed on the grid of the vacuum tube 1. Such a curve for a circuit like that shown in Fig. 1 is given in Fig. 5.

Curves similar to those illustrated were made by utilizing circuit constants as follows: The vacuum tube 1 was a screen-grid tube having an amplification constant of approximately 200 and an internal plate resistance of 500,000 ohms. The coils 3 and 4 were of 225 microhenries inductance, and the ratio of resistance to reactance at the frequency at which the curve was made was .007. The frequency used was 700 kilocycles. The condensers 2 and 5 were variable air condensers whose maximum capacity was about 350 micro-micro-farads. The coupling between the coils 3 and 4 was 4 microhenries.

I have discovered that the width X of the resonance curve as illustrated in Fig. 5 is controlled by the amount of coupling between the primary and the secondary circuit. I carry out another object of my invention, that is, to obtain a constant band width at all carrier frequencies by providing coupling to give the desired band width. The flatness of the resonance curve, I have found, depends on the series resistances of the primary and secondary circuits.

I have also discovered that in receivers such as illustrated in Fig. 3 when the frequency to which the circuits are tuned is varied by varying condensers 2 and 5 the band width also varies so that in some cases selectivity is rather poor and in others attenuation of high audio frequencies is quite noticeable in reproduction. By other elements of my invention which are described below the band width X is maintained constant regardless of the carrier frequency to which my improved receiver is tuned.

Referring now to Fig. 6, which illustrates a single radio frequency amplifier stage built according to my invention, 3 and 4, as in Fig. 3 are coils inductively coupled together, 11 and 12 are small non-inductive resistances, 13 and 14 are by-pass condensers connected across the plate and grid batteries 15 and 16, and 17 is a coupling condenser. 19 is the filament battery.

The purpose of the condenser 17 in Fig. 6 is to control the electrostatic coupling between the primary and secondary circuits 2—3 and 4—5 so that the resonance curve will have the same width in cycles across the flat portion at all carrier wave frequencies. That this is so is explained below.

The circuit shown in Fig. 6 may be separated for purposes of analysis into two coupling systems, shown in Figs. 7a and 7b. In Fig. 7a there are two coils coupled by mutual inductance of value M. A current I flowing in $L_1$ induces a voltage $I\omega M$ in the coil $L_2$. $\omega$ is the angular velocity of the current. In Fig. 7b there are two condensers $C_1$ and $C_2$ coupled by the condenser $C'$. A current $I$ flowing in $C_1$ produces a voltage $$I \times \frac{1}{j\omega} \times \left( \frac{\frac{1}{C_1 C_2}}{\left(\frac{1}{C_2}+\frac{1}{C'}\right)} \right)$$

across the secondary condenser $C_2$.

Since the tuning of the two circuits to various carrier wave frequencies is accomplished by varying the condensers $C_1$ and $C_2$, it is found that the voltage developed across the secondary condenser $C_2$ is given by the expression:

$$E_2 = \frac{I}{j\omega} \times \frac{\omega^2 L_1}{1+\frac{1}{\omega^2 L_2 C'}}$$

It will be seen therefore that each coupling system produces a voltage in the secondary circuit which increases with frequency. This fact is made use of in my invention by arranging the circuits so that the voltage produced by the mutual inductance coupling shall be opposite in direction to the voltage produced by the condenser coupling. At low wave frequencies where the condenser coupling is ineffective the mutual inductance provides sufficient coupling. At higher wave frequencies the mutual inductance coupling is too large, but the condenser coupling becomes increasingly effective, and holds the total band width at a constant figure.

That is, in the ordinary tuned radio frequency amplifier the coefficient of coupling between the primary and secondary circuits is constant at all carrier frequencies and consequently the received band width is approximately a constant fraction of the carrier frequency. Thus, for example, if the band width of an ordinary tuned radio frequency amplifier at 500 kilocycles were 5 kilocycles then at 1500 kilocycles the band width would be 15 kilocycles. This result is apparent from a study of Fig. 2.

In accordance with my invention I vary the coupling coefficient with the carrier frequency, as for constant band width there is required a coupling coefficient which varies inversely with the carrier frequency. In my receivers the coefficient of coupling has a high value at their low wave frequencies and decreases as the frequency increases.

In Fig. 6 this result is obtained by adding together two coupling coefficients, one, the inductive coupling coefficient, being constant, and the other, the capacitive coupling coefficient, varying with the frequency. The capacitive coefficient of coupling of the circuit shown in Fig. 6 depends upon the value of condenser 17 and condensers 2 and 5 and, since condensers 2 and 5 vary in capacity with the tuning it is seen therefore that the capacity coefficient of coupling also varies with the tuning. By varying the coefficient of coupling of the tuned circuits shown in Fig. 6 with the carrier frequency to which those circuits are tuned and by arranging the inductive coupling such that the voltage induced in the coil 4 by the inductive coupling is opposite in direction to the voltage induced by virtue of the capacitive coupling I maintain a substantially constant band width at all carrier frequencies.

Fig. 8 shows a group of resonance curves made with a circuit like that in Fig. 6 with the coupling adjusted to various values, curve A being the case of weakest coupling and curve I the case of strongest coupling. In my circuits, close coupling, that is, coupling sufficiently close to cause double humped resonance curves, is utilized.

Fig. 9 shows the effect of adding resistance to each tuned circuit when the coupling is adjusted as in curve G of the preceding figure. Curve G' results from the addition of a small amount of resistance, while G''' was produced by adding a large amount of resistance.

Any desired width of band and any degree of flatness of the band may be secured by suitable adjustments of the coupling means and of the circuit resistance. If the resonance curve is flat through a range of 5000 cycles on each side of the carrier frequency, the audio frequency output will be correspondingly uniform from zero frequency to 5000 cycles (providing the audio frequency amplifier has a flat charactertistic, as it usually has).

However, it is not necessary to make the audio frequency characteristic perfectly flat. The radio frequency output may be made to rise as the frequency increases so as to compensate for a falling audio frequency amplifier characteristic. Or, with a flat audio frequency amplifier characteristic, the radio frequency characteristic may rise any desired amount to compensate for attenuation of high frequencies in the radio-telephone transmitter. On the other hand, the amplifier may be so adjusted as to allow the higher frequencies to be attenuated, but to a smaller degree than in the usual tuned receiver.

Thus, assume, for example, that the radio frequency amplifier shown in Fig. 6 is to be used in connection with an audio frequency amplifier having a flat characteristic, that is, an audio frequency amplifier in which all frequencies between 0 and 5,000 are amplified equally. The radio frequency amplifier of Fig. 6 should be adjusted so that it has a substantially flat characteristic such as shown in G'' of Fig. 9.

On the other hand, should the audio frequency amplifier have a falling characteristic, that is, one in which frequencies near 5,000 cycles per second are attenuated the circuit constants of the amplifier shown in Fig. 6 should be so adjusted as to have a characteristic such as shown by curve G of Fig. 9. In such a case the radio frequency amplifier will have a rising characteristic thereby compensating the audio frequency falling characteristic and accordingly the resultant audio frequency output of the receiver will be undistorted.

Other combinations may be had such as a falling radio frequency characteristic with a rising audio frequency characteristic or if desired, when an audio frequency amplifier having a falling characteristic is utilized, the radio frequency amplifier may, if desired, be given either a flat, rising or falling characteristic. The choice of course, depends on the particular reproduction desired.

The circuits 2, 3 and 4, 5 of Fig. 6 are coupled together in one of the ways shown in Figs. 10 to 17 inclusive. In Fig. 10 the two coils 3, 4 are placed close together with their axes parallel, the distance between them being regulated according to the amount of coupling desired. An electrostatic screen 19 is placed between the coils to reduce the electrostatic capacity between the windings.

As shown in Fig. 11, the screen 19 of Fig. 10 takes the form of a slotted plate or comb-like structure.

Figure 12:
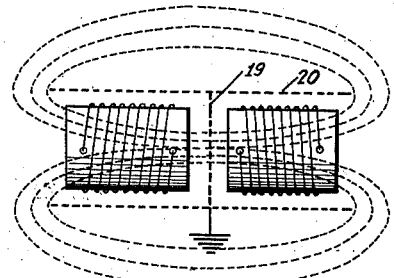

In Fig. 12 the coils are placed end to end, with an electrostatic screen 19, 20 between and around them.

In Fig. 13 the same arrangement is used, except that the electrostatic screen is placed differently, there being a single screen 21 surrounding the coils.

Figure 14:
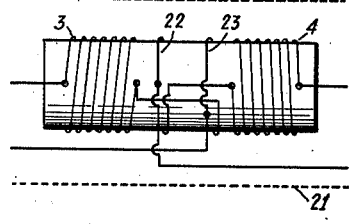

In Fig. 14 reversed coupling coils 22, 23 are connected in series with the two main coils 4, 3 respectively, there being a single screen 21 surrounding the coils.

Figure 15:
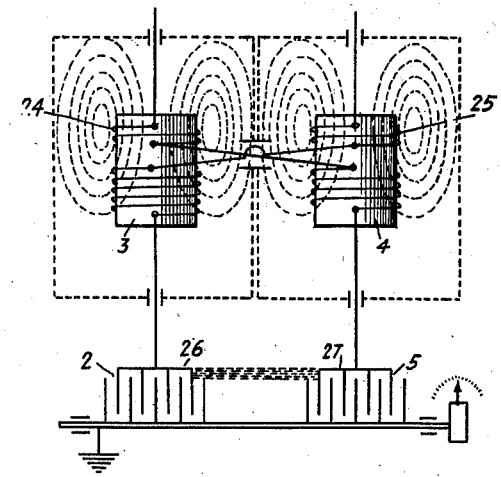

In Fig. 15 the two coils 3 and 4 are in separate electrostatic and electromagnetic shields, and are coupled by the coupling coils 24 and 25. The two tuning condensers 2 and 5 are so placed that the end plates of the stators 26, 27 constitute the two plates of a coupling condenser between the coils 4 and 3, the active area of these plates being the portion which is not covered by the rotor plate.

By suitably shaping the end plates of the rotor groups and by placing between the stator groups a shield in which there is a suitably shaped aperture, the coupling capacity between the condensers may be made to have any desired value and to vary in any desired manner as the condenser rotors are turned to tune the receiver to different wave frequencies. If desired, it is possible to have the capacitive coupling between the end plates of two rotor groups.

In Fig. 16 both coils and condensers are in shielded compartments 28, 29 and coupling is provided by the coupling coils 24 and 25 and the coupling condenser 30. In Fig. 17 coupling between the two coils 3 and 4 is provided by the coupling coils 31 and 32, the remaining portions of the tuned circuits being shielded. In Fig. 17 no capacitive coupling is shown but may be added in one of the ways described above.

The shielding is in the cases of Figs. 10, 11, 12, 13 and 14 preferably of the type shown in Fig. 11. However, it may take other forms such as thin strips of metal pasted or glued on paper and wound about, and if needed, wound within the coils. The shielding as shown should be grounded at convenient points. Where the shielding surrounds both coils and condensers, it may take the form of metallic boxes.

The amount of shielding will depend of course on the amount of electrostatic coupling as compared to the inductive coupling necessary to give the desired band width.

As shown in Fig. 10, the inductive coupling is such that the voltages induced in coil 4 by the inductive coupling is opposite in direction to that induced by the electrostatic coupling. Such also is the case in Figs. 11, 12 and 13. In Fig. 14 the voltages induced in coil 4 by the inductive coupling between coil 4 and coil 3 is also opposite in direction to that induced in coil 4 by the electrostatic coupling. To reduce the inductive coupling between the coils 3 and 4 which in the structure shown may be too large, reversed coupling coils 22—23 shown as single turns are utilized. These coils have the effect of reducing the inductive coupling to a desired value.

In Figs. 15 and 16 the direction of the coupling coils 24—25 with relation to coils 3—4 respectively controls the direction of the magnetic coupling which should be chosen such that the voltages induced are opposite in direction to the voltages caused by the electrostatic coupling between the end plates of the stators 26—27 in the case of Fig. 15 and condenser 30 in the case of Fig. 16.

Fig. 18 illustrates a radio receiver embodying some of the described features. Each of the three stages of radio frequency amplification and selection is enclosed in a separate shielded compartment 33 to prevent the receiver from oscillating. Taking the second stage as an example, the output of a screen-grid vacuum tube 34 is impressed on the primary circuit consisting of the coil 35, the coupling coil 36 and the variable condenser 37.

The secondary circuit consisting of the coils 38 and 39 and the variable condenser 40 is coupled to the primary circuit by mutual inductance between 36 and 38. The electrostatic screen 41 between the coils reduces the coupling capacity, but does not completely stop it. As indicated in the figure, electrostatic flux leaks around the edges of the screen 41 between the coils. By-pass condensers 42 and 43 complete the radio frequency circuits and keep radio frequency currents from flowing through the batteries.

The leakage of the electrostatic flux is controlled by shield 41 so that it is of a desired value giving a constant band width. Although, due to the fact that there is no resistance added to the tuned coupling circuits, the resonance curve may be humped, as in Fig. 8. However, in a receiver of this type, this humped characteristic will not be such as to cause appreciable distortion in reproduction.

Fig. 19 illustrates another embodiment of my invention in a complete receiver. In this receiver the arrangement shown in Fig. 16 is used, and resistance units 44, 45 are placed in the tuned circuits to make the resonance curve sufficiently flat. Everything except the batteries is contained in two metal boxes 46, 47, the tuning condensers being in box 46 and the vacuum tubes, coils, coupling condensers and battery filters in 47. Each box is divided into compartments by walls 48, 49 so that there is no coupling between two different stages, or any stray coupling between the primary and secondary of any one stage. The shielding between stages is necessary to prevent the generation of oscillations in the receiver as for example sustained or intermittent radio frequency oscillations.

As an additional means of preventing generation of oscillations, the plate battery connections go through radio frequency filters which prevent any radio frequency current from getting into the battery and thence into another stage. Separate grid batteries are shown for the different screen-grid tubes, but if desired a common battery may be used with radio frequency filters similar to those used in the plate battery circuit.

Each filter consists of a large condenser shunting the battery, and an inductance coil in series with the battery. The coil 50 and condenser 51 in Fig. 19 constitute one of the battery filters, 51 being about 1 microfarad and 50 about 200 microhenries. These values are not at all critical however. The pairs of elements, 52—53 and 54—55 form other battery filters. In the plate circuit of detector 56 is another filter consisting of the inductances 57 and 58 each of 60 millihenries inductance, and the three condensers 59, 60 and 61, each of .001 microfarad capacity. This filter also helps to prevent generation of oscillations.

In Fig. 19, it is to be noted that within each stage the primary and secondary circuits are completely shielded from each other. To vary the coupling between the tuned circuits, condensers 62 are provided so that a desired frequency band width may be obtained. Small resistances 44, 45 are also provided for maintaining the characteristic of the amplifier at a desired degree of flatness. Condensers 62, and in fact in all of the embodiments of my invention all of the similar coupling condensers, should couple relatively high potential points on each of the coils 63 and 64, or their equivalents as for example in Fig. 15, coils 3 and 4.

The following dimensions and circuit constants were found to be suitable for this receiver. The antenna coupling resistance 65 was 5000 ohms. 66 was a screen-grid vacuum tube having a plate resistance greater than ½ megohm. The coils 63 and 64 were wound with 80 turns on 2" "Bakelite" tubes. The coupling coil 67 was 2¾ turns wound on the same tube as coil 63, and separated from it by a space of ⅓ inch. The coupling coil 68 was similarly disposed with respect to 64. The condensers 69 and 70 had maximum capacities of 390 micro-microfarads, and were each provided with small adjustable shunting condensers which compensated for the difference between the plate-to-filament capacity of tube 66 and the grid-to-filament capacity of tube 71. Resistances 44 and 45 were each 3 ohms. The coupling capacity 62 was .9 micro-microfarad. The voltage applied to the plate of the screen-grid tube was 135, while the voltage applied to the screen was varied from 0 to 67 volts, this variation being a convenient method of controlling the amount of radio frequency amplification without affecting the operation of the tuned circuits. The second and third stages were similar in every respect to the first, except that, of course, they had no antenna coupling arrangement. The audio-frequency amplifying system is not shown, as it may be similar to those used in receivers now in common use.

Fig. 20 illustrates still another embodiment of my invention, in which the coils are coupled as shown in Fig. 14, while capacity coupling to control the received band width is secured by the method illustrated in Fig. 15.

In this receiver the primary and secondary coils 3, 4 respectively of one stage are wound on a "Bakelite" tube 6 inches long and 2 inches in diameter. Each coil is approximately 1.6 inches long, and the distance between the adjacent ends of the two coils is 2 inches. The mutual inductance between the coils is reduced to the proper value by a single turn of wire connected in series with the primary coil, placed $\frac{2}{10}$ inch from the nearer end of the secondary coil, and connected so that its coupling to the secondary, is opposite in direction to the coupling of the primary to the secondary coil as shown in Fig. 14. The resulting total mutual inductance is about 1 microhenry. The circuits are tuned by variable condensers 72 having a maximum capacity of about 340 micro-microfarads. The electrostatic capacity between the high-potential ends of the coils is reduced to a suitable value by a grounded electrostatic shield in the form of a slotted metallic tube 21, 3 inches in diameter which is placed concentrically over the coils. Electrostatic coupling between the condenser stator plates is adjusted to a suitable value by means of a partial electrostatic screen between the condensers. Each stage is suitably shielded by metallic boxes 73.

In Figs. 18, 19 and 20 the inductive and capactive coupling in each stage are relatively reversed. That is, in any stage the voltage induced in the secondary circuit of that stage by the capacitive coupling is opposite in direction to the voltage induced in that circuit by the inductive coupling.

By the term "stage" I mean broadly all of the elements included between two like points of similar function in a radio signalling system. Thus, for example, referring to Fig. 19, the elements between the input electrode of tube 66 and the input electrode of tube 71 would be a stage. Or the stage may, for example, be considered to be all of the elements between the anode of tube 66 and the anode of tube 71.

I claim as my invention:

1. In a multi-stage tuned radio frequency amplifier, a plurality of four electrode tubes, tuned circuits between the tubes, the inductive elements of said circuits being electrostatically shielded from each other, and means for establishing a capacity coupling between points of relatively high radio frequency potential on said inductances.

2. A multi-stage radio frequency amplifier comprising a plurality of four electrode vacuum tubes, electromagnetically and electrostatically coupled tuned circuits between the tubes, each of said circuits comprising a fixed reactance and a variable reactance and each of the fixed reactances in each of the stages of the amplifier being shielded from each other.

3. A multi-stage radio frequency amplifier comprising a plurality of four electrode vacuum tubes, electromagnetically and electrostatically coupled tuned circuits between the tubes, each of said circuits comprising a fixed inductance and a variable condenser and each of the inductances in each of said stages being shielded from every other inductance.

4. In a radio signalling system, a pair of tuned circuits inductively coupled together, each circuit consisting of a variable condenser and an inductance, said condensers being arranged so as to establish, in addition to the inductive coupling, a capacitive coupling between the circuits and means for electrostatically shielding the inductances.

5. In a radio signalling system, a pair of tuned circuits, inductances in each circuit for inductively coupling the circuits together, a variable condenser in each circuit for varying the tuning of each circuit, the high potential groups of plates of said condensers being so arranged with reference to each other as to establish a predetermined capacitive coupling between the tuned circuits.

6. A high frequency network comprising a pair of resonant oscillation circuits having fixed inductors, means for shielding each of said inductors, variable tuning condensers connected to said inductors having a mutual capacitance between stator elements thereof, said capacitance providing electrostatic coupling between said circuits and a single means for simultaneously adjusting said tuning condensers.

7. A high frequency network comprising a pair of resonant oscillation circuits having fixed inductors, means for shielding each of said inductors, variable tuning condensers connected to said inductors having a mutual capacitance between stator elements thereof, a shield provided with an aperture disposed between said elements, said capacitance providing electrostatic coupling between said circuits and a single means for simultaneously adjusting said tuning condensers.

8. A band selective transmission network comprising a pair of syntonous tuned circuits, means for varying the resonance of said circuits simultaneously, coupling means therefor adapted to produce an increase in the width of the selected band as the frequency of tuning is increased, and additional coupling means adapted to produce a band width variation complementary to that due to said first mentioned coupling means, whereby the band width is substantially constant for a wide range of tuning frequencies.

9. A band selective transmission network comprising a pair of syntonous tuned circuits, means for varying the resonance of said circuits simultaneously, coupling means therefor adapted to produce an increase in the width of the selected band as the frequency of tuning is increased, and additional coupling means adapted to produce a band width variation complementary to that due to said first mentioned coupling means, whereby the band width is substantially constant for a wide range of tuning frequencies, and one of the said coupling means comprises an impedance connected in shunt between the tuned circuits and the other of said coupling means comprises an impedance connecting the tuned circuits serially.

10. A band selective transmission network comprising a pair of syntonous tuned circuits, means for varying the resonance of said circuits simultaneously, coupling means therefor adapted to produce an increase in the width of the selected band as the frequency of tuning is increased, additional coupling means adapted to produce a band width variation complementary to that due to said first mentioned coupling means, whereby the band width is substantially constant for a wide range of tuning frequencies and one of the said coupling means comprises an impedance common to each of the said tuned circuits and the other of said coupling means comprises an impedance connecting said tuned circuits serially.

11. A band selective transmission network comprising a pair of syntonous tuned circuits including variable tuning condensers of equal capacity, said capacities being mechanically coupled for simultaneous tuning of said circuits, coupling means for said circuits comprising an impedance common to both circuits which is capacitive throughout the tuning range of the network and additional inductive coupling means comprising coupled windings phased to complement the capacitive coupling throughout the tuning range, said capacitive coupling and said inductive coupling being proportioned to provide a substantially constant width transmission band throughout the range of frequencies to which the network can be tuned.

12. A signal selective network, comprising a plurality of resonant non-amplifying circuits, each of said circuits simultaneously tunable to substantially the same desired frequencies, said circuits coupled both inductively and capacitatively, so that the coupling co-efficient decreases as frequency increases without a mechanical adjustment of the coupling instrumentalities, the said inductive coupling being out of phase with the capacitive coupling, in such a way that selectivity remains substantially uniform over the tuning range.

13. In combination in a radio receiver, an untuned radio frequency amplifier element, a signal selecting network, and a second untuned radio frequency amplifier element in the order named, said signal selecting network comprising a plurality of resonant non-amplifying circuits, each of said circuits simultaneously tunable to substantially the same frequencies, said circuits coupled both inductively and capacitatively so that the coupling co-efficient decreases as frequency increases without a mechanical adjustment of the coupling instrumentalities, in such a way that selectivity remains substantially uniform over the tuning range.

14. In combination in a radio receiver, an untuned radio frequency amplifier element, a signal selecting network, and a second untuned radio frequency amplifier element in the order named, said signal selecting network comprising a plurality of resonant non-amplifying circuits, each of said circuits simultaneously tunable to substantially the same frequencies, said circuits coupled both inductively and capacitatively so that the coupling co-efficient decreases as frequency increases without a mechanical adjustment of the coupling instrumentalities, the said inductive coupling being the major coupling and the said capacitative coupling being out of phase therewith, in such a way that selectivity remains substantially uniform over the tuning range.

15. A signal selective network, comprising a plurality of resonant, capacitatively tuned, non-amplifying circuits, each of said circuits simultaneously tunable to substantially the same desired frequencies, said circuits coupled both inductively and capacitatively, but by a larger magnitude inductively than capacitatively, said inductive coupling and capacitative coupling being out of phase, so that as the tuned frequency increases the summation coupling decreases due to the larger inductive coupling remaining substantially constant while the smaller capacitative coupling out of phase therewith increases in absolute value.

16. A high frequency electrical coupling system having input and output terminals for interconnecting successive portions of a multi-stage thermionic radio receiver, comprising, at least one resonant circuit tunable throughout a frequency range, and fixed impedance means included in said coupling system producing effects so variable with frequency as to maintain the resonance band width of said coupling system substantially constant throughout said tunable frequency range.

17. A high frequency electrical coupling system having input and output terminals for interconnecting successive portions of a multi-stage thermionic radio receiver, comprising, at least one resonant circuit tunable throughout a frequency range, and fixed impedance means included in said coupling system producing effects so variable with frequency as to render the selectivity of said coupling system when tuned to a frequency adjacent the upper limit of said tunable range substantially equal to the selectivity of said coupling system tuned to a frequency adjacent the lower limit of said tunable range.

18. A tunable high frequency electrical coupling circuit adapted to interconnect successive portions of a multi-stage thermionic radio receiver, comprising a resonant secondary circuit, and a primary circuit including a plurality of fixed impedance means so arranged and coupled to said secondary circuit as to produce effectively in said secondary circuit dualistic reactions proportioned to maintain the selectivity of said coupling system substantially constant throughout a tunable frequency range.

19. A tunable high frequency electrical coupling system adapted to interconnect successive portions of a multi-stage thermionic radio receiver, comprising, a resonant secondary circuit, and a primary circuit including a plurality of fixed impedance means so arranged and coupled to said secondary circuit as to produce effectively in said secondary circuit dualistic reactions which vary oppositely with frequency at such rate as to maintain the selectivity of said coupling system substantially constant throughout a tunable frequency range.

20. An electric coupling system comprising a pair of resonant circuits tunable to the same frequency over a wide range of frequency, a control member for simultaneously tuning said circuits, means producing a pair of couplings between said circuits which vary with frequency in an opposite manner relatively to each other, said couplings being proportioned to increase when the frequency of tuning is decreased whereby the width of the frequency band transmitted by said system is maintained substantially uniform over the tuning range.

21. An electric coupling system, according to claim 20, in which said pair of couplings is an electromagnetic coupling and an electrostatic coupling.

22. An electric coupling system comprising a pair of resonant circuits tunable to the same frequency over a wide frequency range, a control member for simultaneously tuning said circuits, means producing an electromagnetic coupling and means producing an electrostatic coupling, between said circuits, said couplings, being proportioned to provide a resultant coupling between said circuits which is substantially less than optimum when said circuits are tuned to a high frequency and becomes greater as said circuits are tuned to lower frequencies.

23. A band pass amplifier comprising at least two tuned circuits, combined capacitative and inductive couplings between the circuits, and means including a condenser provided with a grounded adjustable plate for varying the capacitative coupling simultaneously with tuning adjustments so as to maintain the accepted band width constant.

24. A high frequency network comprising a pair of resonant oscillation circuits having fixed inductors, variable tuning condensers connected to said inductors having a mutual capacitance between stator elements thereof, said capacitance providing electrostatic coupling between said circuits, a single means for simultaneously adjusting said tuning condensers, and means controlled by said single adjusting means for varying said electrostatic coupling between the resonant circuits.

25. The invention defined in the preceding claim 24, wherein the electrostatic coupling means is simultaneously varied with the tuning in a predetermined manner.

26. A high frequency network comprising a pair of resonant oscillation circuits having fixed inductors which provide mutual inductive coupling, variable tuning condensers connected to said inductors having a mutual capacitance between stator elements thereof, said capacitance providing electrostatic coupling between said circuits, a single means for simultaneously adjusting said tuning condensers, and means controlled by said single adjusting means for varying said electrostatic coupling between the resonant circuits.

27. A high frequency network comprising a pair of oscillation circuits, each provided with a variable condenser having rotors and stators, a common mechanical control for the condenser rotors of both circuits, and means operatively connected with the common control to variably adjust the capacity coupling provided between adjacent end stators of said condensers, said capacity coupling providing an energy transfer path between said oscillation circuits.

28. A high frequency network comprising a pair of oscillation circuits, each provided with a variable condenser having rotors and stators, a common mechanical control for the condenser rotors of both circuits, and means operatively connected with the common control to variably adjust the capacity coupling provided between predetermined stators of said condensers, said capacity coupling providing an energy transfer path between said oscillation circuits, an inductance coil included in each of said circuits, said two coils providing mutual inductive coupling.

29. A high frequency network comprising a pair of oscillation circuits, each provided with a variable condenser having rotors and stators, a common mechanical control for the condenser rotors of both circuits, and means operatively connected with the common control to variably adjust the capacity coupling provided between predetermined stators of said condensers, said capacity coupling providing an energy transfer path between said oscillation circuits, and mutual inductive coupling between the circuits providing a second energy transfer path.

30. In a radio receiver, a pair of tunable radio frequency circuits, a common means for tuning the circuits through a predetermined frequency range and maintaining them capacitatively coupled throughout said tuning range, said common means comprising a pair of variable condenser units having a common rotor operating shaft, said units having adjacent end stators adapted to provide said capacitative coupling, and means movable with said operating shaft for controlling the degree of coupling between said end stators simultaneously with the tuning of said circuits through said frequency range.

31. In combination, in a modulated carrier current coupling system, two reactively coupled resonant circuits, each circuit being tuned to a common operating carrier frequency and comprising reactive elements of opposite sign, reactive means common to said coupled circuits producing a response characteristic such that the system is made responsive to all the modulation frequencies of said carrier, and said circuits including sufficient resistance to render them uniformly responsive to said modulation frequencies, each of said circuits containing a substantial part of said resistance.

RENE A. BRADEN.